United States Patent
Murphey et al.

(10) Patent No.: US 7,354,033 B1
(45) Date of Patent: Apr. 8, 2008

(54) TAPE-SPRING DEPLOYABLE HINGE

(75) Inventors: Thomas W Murphey, Albuquerque, NM (US); Eric L Pollard, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/461,547

(22) Filed: Aug. 1, 2006

(51) Int. Cl.
*F16F 1/18* (2006.01)
(52) U.S. Cl. ............... 267/160; 267/151; 52/653.2
(58) Field of Classification Search .............. 16/225; 52/108, 646, 653.2, 658; 267/47, 148, 149, 267/36.1, 158, 151, 160
See application file for complete search history.

(56) References Cited

U.S. PATENT DOCUMENTS

| | | | | |
|---|---|---|---|---|
| 4,422,627 | A * | 12/1983 | Schmidt et al. | 267/148 |
| 4,544,610 | A * | 10/1985 | Okamoto et al. | 428/611 |
| 4,696,459 | A * | 9/1987 | Woltron et al. | 267/36.1 |
| 6,357,733 | B1 * | 3/2002 | Wulz et al. | 267/158 |
| 6,374,565 | B1 * | 4/2002 | Warren | 52/653.2 |
| 6,910,304 | B2 * | 6/2005 | Warren | 52/108 |
| 7,160,627 | B2 * | 1/2007 | Pyzik et al. | 428/539.5 |
| 2005/0022465 | A1 * | 2/2005 | Warren et al. | 52/653.2 |

OTHER PUBLICATIONS

Fred L. Beavers, et. Al, "Design and testing of an Elastic Memory Composite Deployment hinge spacecraft," 43rd Structures, Structural Dynamics, and Materials Conf., Apr. 22-25, 2002, AIAA-2002-1452 (pp. 2-4).
Pollard, EL & Murphey, TW, "Novel, Concentrated Stain Deployable Architectures Utilizing Shape Memory Alloy Flexures," *NIA Large Space Systems Workshop*, Santa Fe, NM, US, 2005. (Aug. 16, 2005) (pp. 3, 7).
Jason D. Hinkle, Lee D. Peterson, Peter A. Warren, "Structural Performance of an Elastically Stowable Tubular Truss Column" Presented at the 43rd Structures, Structural Dynamics and Materials Conference, Apr. 22-25, 2002 Denver, Colorado AIAA 2002-1555. (Shows an example of another deployable truss based on tape-springs).
Mark S. Lake, et al, "Application of elastic memory composite materials to deployable space structures," AIAA Space 2001 Conf., Aug. 28-30, 2001, AIAA 2001-4602. (p. 7).

* cited by examiner

*Primary Examiner*—Chris Schwartz
(74) *Attorney, Agent, or Firm*—Kenneth E. Callahan

(57) ABSTRACT

A tape-spring shaped, articulating member used in deployable structures having a resilient, compliant hinge region and rigid non-hinge regions, thereby enabling a smaller fold radius and greater packaging efficiency. The increased compliance in the hinge region may be obtained by using a more compliant material in the hinge region or reducing the cross-sectional area in the hinge region. The hinge region may be reinforced with integrated shape memory alloy features serving as folding mandrels, to enhance structural stiffness and strength performance of the hinge, and to exhibit authority over the rate and sequencing of strain release when deployed.

5 Claims, 3 Drawing Sheets

TAPE-SPRING DEPLOYABLE HINGE

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention generally relates to hinges used for reconfiguring deployable structures, and in particular to tape-spring type deployable hinges used in such structures.

Spacecraft frequently have structural systems that are mass efficient and can be folded into a packaged state. Following launch they are subsequently unfolded or deployed to support solar arrays, antennas, instrumentation, etc. These deployable structural systems require compliance to reconfigure between packaged and deployed states and are typically implemented by one of two approaches. Most commonly, deployment is accommodated through rolling or sliding contact joint mechanisms. These articulated structures employ mechanical components such as pin-clevis joints and ball and socket joints. The second approach is to use material deformations to accommodate folding which avoids introducing imprecision arising from mechanical connections and allows the exploitation of stored strain energy to motivate self-deployment.

Recently, there has been renewed interest in the development of deployable structure architectures based on material deformations. Prior art has focused on axially prismatic or a constant cross-section along the length articulating members including shape memory alloy hinge members, tape-spring shaped hinge members, hinge members consisting of a combination of shape memory alloy and tape-spring shaped features, and non-axially prismatic folding members, such as tubes with discrete lengths slotted to form hinge regions.

Tape-spring hinges are often used in deployable structures to serve as simple and reliable hinge mechanisms with strain energy capacity, which when released, can motivate the reconfiguration of the structural system from a packaged to a deployed state. A carpenter's measurement tape is an example of a tape spring. It has geometric stiffness when extended. Tape springs used in deployable structures are typically thin shells of a elastic material, such as spring steel, copper-beryllium alloys, or carbon fiber reinforced plastic (CFRP) that are curved about their primary structural axis. They can be buckled and folded about an arc. When released they spring back to their strain free shape and have a tendency to lock into this lower energy state. Tape springs used for the members of a deployable structure can have integrated hinge regions designed for folding. Typically, if the cross-section of the tape spring is increased, the stiffness and strength performance of the member is increased. However, the more the cross-section thickness is increased, the greater the fold radius. This in turn increases the stowed volume of the structure. It is desirable to have a minimal radius of curvature of the folded hinges while maintaining the stiffness and strength of the deployed hinges. The present invention addresses this trade.

SUMMARY OF INVENTION

An embodiment of the present invention provides a non-axially prismatic, thin-walled open form, and monolithic articulating member with a resilient, compliant hinge and rigid non-hinge regions with both terrestrial and celestial utility. A tape-spring shaped element with an embedded hinge of this type packages to a smaller volume than a slotted tube articulating member of similar radius and has less mass than a member uniformly composed of a resilient, compliant continuum. This approach strategically places resilient, compliant material at the locations of the tape-spring element required to fold and places a rigid material at non-hinge regions. Shape memory alloy features are integrated into the hinge region to serve as folding mandrels, to enhance structural stiffness and strength performance, and to exhibit authority over the rate and sequencing of strain release.

DESCRIPTION OF THE PREFERRED EMBODIMENT

Figure 1A:
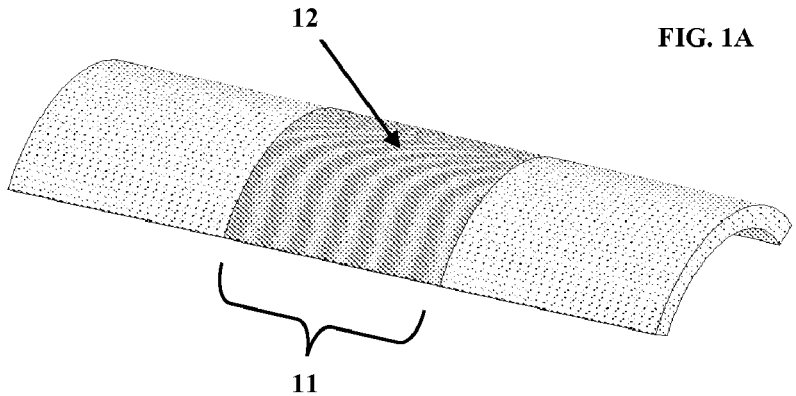
FIG. 1A is a monolithic tape spring with an integrated resilient, compliant hinge region.
Figure 1B:
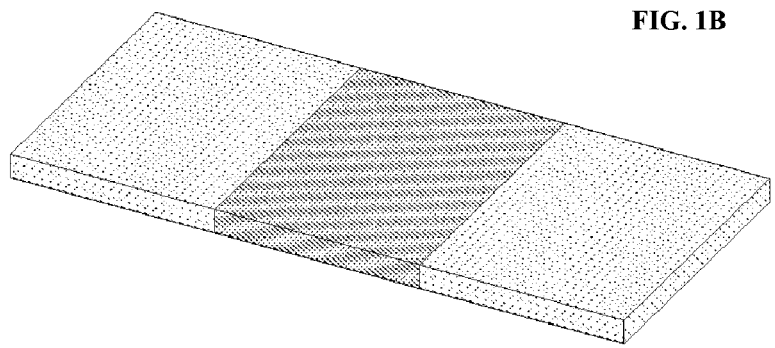
FIG. 1B shows the FIG. 1A tape spring and hinge region strained to flatten transversely.
Figure 1C:
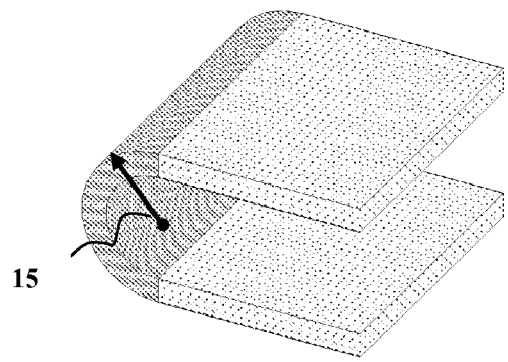
FIG. 1C shows the FIG. 1A tape spring hinge folded over by 180 degrees.

One embodiment of the invention is shown in FIG. 1A. The hinge region 11 is the area of greater compliance located at the appropriate position along the tape spring 14. The tape spring 14 can be a member of a deployable structure with one or more integrated hinges 11. FIG. 1B shows this tape spring and hinge region strained to flatten transversely and FIG. 1C shows this tape spring longitudinally folded pi radians at the hinge region. The folded radius (15 in FIG. 1C) times pi is the approximate longitudinal length of the hinge region. In order to minimize the folded radius for increased packaging efficiency, a less structurally efficient, more resilient cross-section is utilized for the hinge regions while a more structurally efficient or more rigidity per mass cross-section is utilized throughout the majority of the structure. This pairing of structural roles can lead to greater mass efficiency. The non-hinge region of the tape spring 14 may be comprised of carbon fiber reinforced plastic (CFRP), fiber glass reinforced plastic, polymer fiber reinforced plastic, unreinforced plastic, aluminum, magnesium, titanium, or other material system with high stiffness to mass properties. The hinge material 12 need only be a more compliant material than that of the tape spring 14 and be able to be integrated into the tape spring by various means known in the art. Hinge material examples may include shape memory alloy, spring steel, or copper beryllium alloy.

Figure 2A:
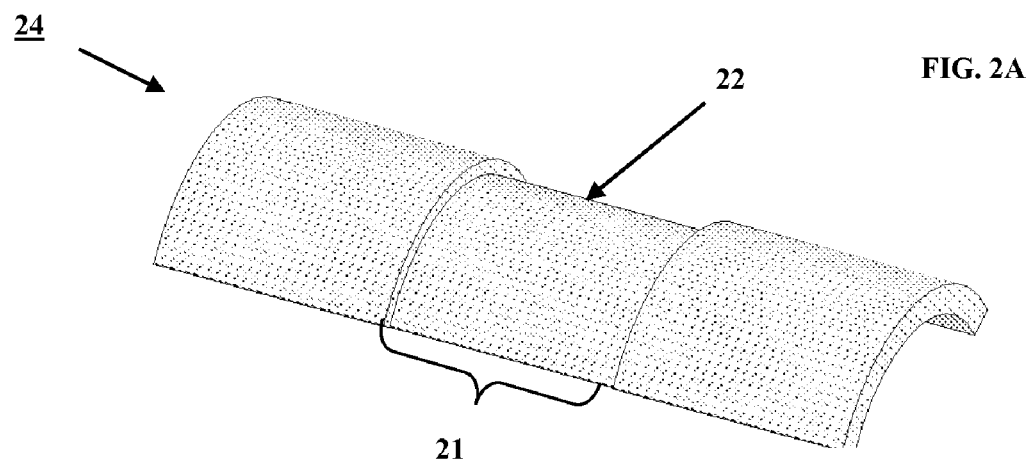
FIG. 2A shows a tape spring with a more compliant hinge region due to a reduced thickness cross-section throughout the hinge region.
Figure 2B:
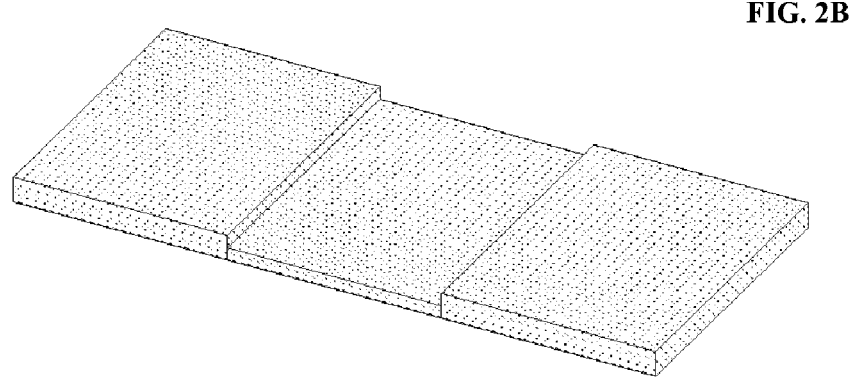
FIG. 2B shows the FIG. 2A tape spring and hinge region strained to flatten transversely.
Figure 2C:
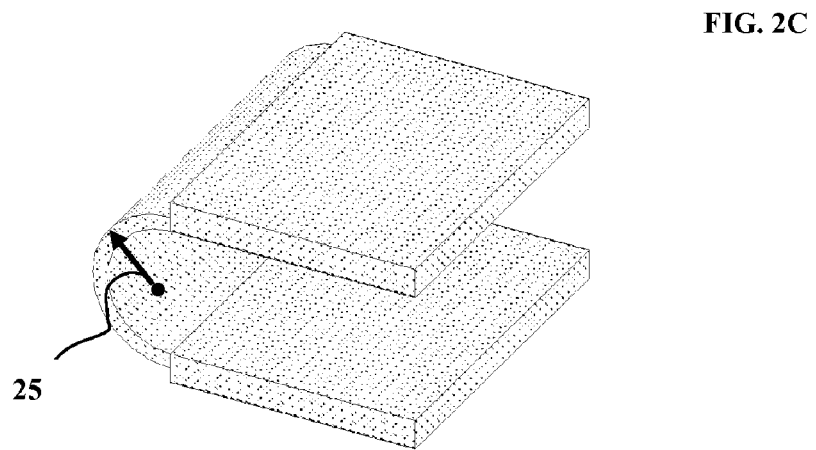
FIG. 2C shows the FIG. 2A tape spring hinge folded over by 180 degrees.

A second embodiment is shown in FIG. 2A in which the increased compliance in the hinge region 21 of the tape spring 24 is accomplished by reducing the thickness of the cross-section in the hinge region. The tape spring and the hinge region may be of the same material, e.g., such as the materials previously mentioned. FIG. 1A shows this configuration, while FIG. 2B shows this tape spring strained to flatten transversely and FIG. 2C shows this tape spring hinge longitudinally folded pi radians. The folded radius (25 in FIG. 2C) times pi is the approximate longitudinal length of the hinge region. Again the radius of curvature 25 is reduced leading to increased packaging efficiency. However, the hinge region 21 is less rigid than the remainder of the structure.

Figure 3A:
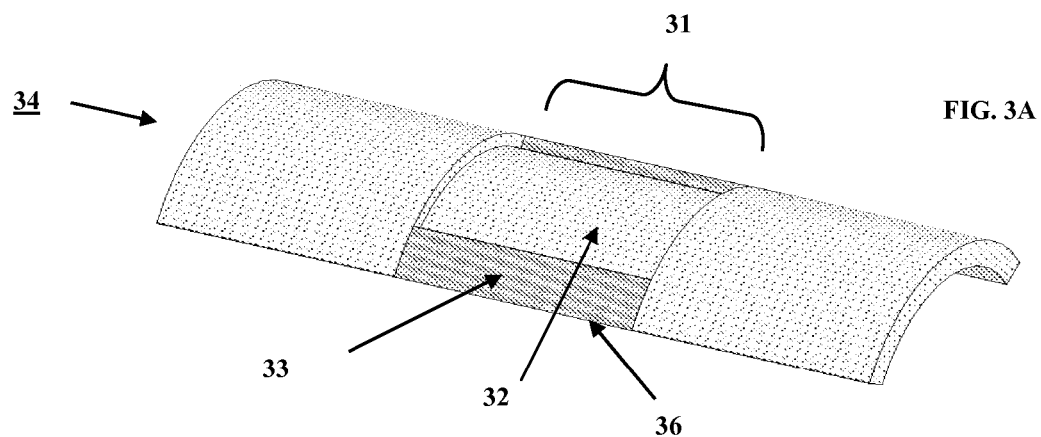
FIG. 3A shows a tape spring with a more compliant hinge region due to a reduced thickness cross-section throughout the hinge region that is reinforced along the edges with shape memory alloy.
Figure 3B:
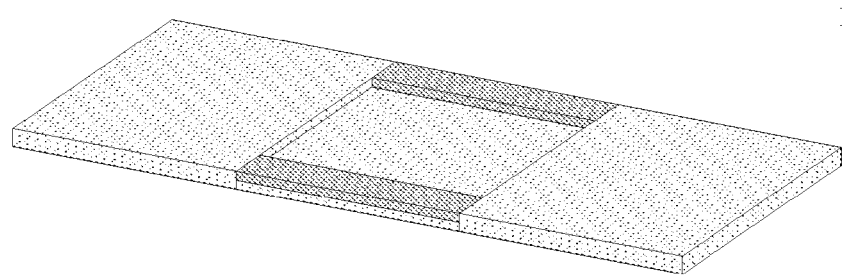
FIG. 3B shows the FIG. 3A tape spring and hinge region strained to flatten transversely.
Figure 3C:
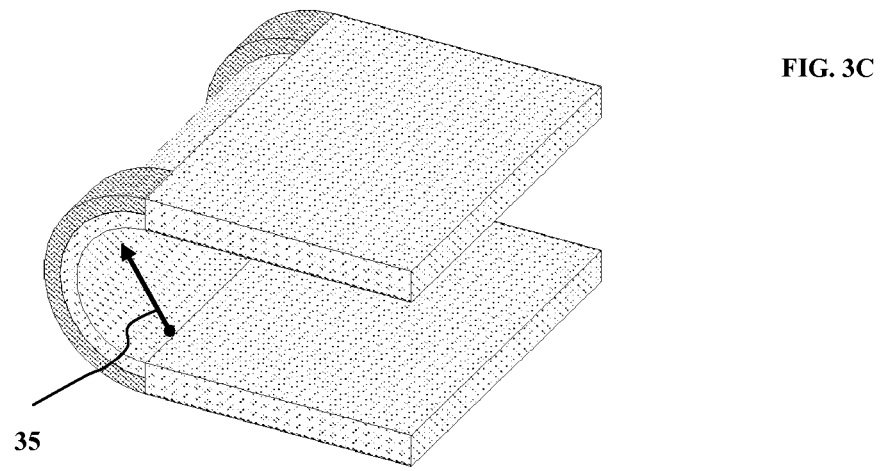
FIG. 3C shows the FIG. 3A tape spring hinge folded over by 180 degrees.

A third embodiment of the tape spring deployable hinge is shown in FIG. 3A. In this case the hinge region 31 is also made compliant by reducing the thickness 32 of the tape spring 34 in the hinge region, but the hinge region is reinforced with shape memory alloy (SMA) features 33. In FIG. 3 the shape memory alloy 33 is shown as two separate wires extending longitudinally across the reduced cross-sectional area 32 and positioned along each lateral edge 36. FIG. 3B shows this tape spring 34 with a hinge region 31 strained to flatten transversely. FIG. 3C shows this tape spring hinge 31 longitudinally folded pi radians with the radius of curvature 35 of the fold times pi substantially equaling the longitudinal length of the hinge region. The thickness and length of the hinge region or the distance from the neutral-plane and the bend radius dictate the strain realized when folded. This configuration serves to mitigate the compromise of deployed performance due to the structurally compromised thinned hinge cross-section 32. Thicker binary NiTi can accommodate the same reduced folded radius 35 as a thinned cross-section through superelastic deformation. A single thin sheet of shape memory alloy could also be used that would extend transversely across the entire hinge region. While CFRP material for the tape spring 34 is preferred, any of the aforementioned materials may be used.

As shown in FIG. 3, shape memory alloy is integrated into the lateral edges of the tape spring to act as a folding mandrel. In addition to enhancing the stiffness and strength performance of the hinge region, the SMA features can exhibit authority over the rate of strain release and over the sequencing of strain release by manipulating their phase through active or passive thermal control during deployment. Viscoelastic polymers or similar materials, which respond to deformations along a hysterisis trend, can be integrated into the hinge regions as an additional lamina. Materials with viscoelastic behavior are commonly used for passive energy dissipation and can exhibit authority over the rate of strain release from a folded hinge. Self-deployment is driven by a combination of the stored strain energy of the elastic CFRP and of the stored inelastic strain energy of the shape memory alloy.

The thin-walled open form of the tape spring with an integrated compliant hinge of the FIG. 3A type can be produced by laying one or more laminas of aforementioned suitable materials the length of the member or interrupted across the hinge region onto a form. The SMA in the form of a wire or thin sheet can be placed on or between the laminas in any sequence at the desired longitudinal position of the hinge with the length of the SMA material being approximately equal to pi times the radius of curvature of the fold when bent 180 degrees. This configuration is co-cured or the SMA features can be attached post-cure to the cured laminate or the extruded or milled metallic with an additional cure or with mechanical fasteners. The hinge cross-section may or may not be symmetric through the thickness.

The invention claimed is:

1. A tape spring-type deployable structure of elastic material having a generally prismatic cross-section when extended except in one or more integrated hinge regions located at desired locations along the tape spring-type structure's length, said hinge region having a radius of curvature when bent, a hinge region longitudinal length of approximately pi times the radius of curvature of said hinge region when said tape spring structure is longitudinally folded pi radians at said desired hinge region, and a compliance metric in the hinge region that is greater than that of the non-hinge regions of said tape spring structure, whereby the stowed volume of said tape spring-type deployable structure when compressed is reduced while essentially maintaining the geometric stiffness when extended.

2. The tape spring-type structure of claim 1, wherein said greater compliance metric in the hinge region is produce by modifying the cross-sectional geometry of said tape spring-type structure in the hinge region by uniformly reducing the thickness of the hinge region.

3. The tape spring-type structure of claim 1, wherein said greater compliance metric in the hinge region is produce by modifying the cross-sectional geometry of said tape spring-type structure in the hinge region by reducing the thickness of the edges of the hinge region more than central area.

4. The tape spring-type structure of claim 1, wherein said greater compliance metric in the hinge region is produced by replacing the elastic material of said tape spring-type structure with a more compliant material in said hinge region.

5. The tape spring structure of claim 4, wherein the more compliant material is a viscoelastic material that is integrated into a reduced cross-sectional area hinge region, whereby authority over the rate of strain release from a folded hinge can be obtained.

* * * * *